United States Patent
Ricco et al.

(10) Patent No.: US 12,247,502 B2
(45) Date of Patent: Mar. 11, 2025

(54) MULTI-CYLINDER INTERNAL COMBUSTION ENGINE, WITH CYLINDERS EQUIPPED WITH INTAKE VALVE VARIABLE ACTUATION SYSTEMS HAVING HYDRAULIC CIRCUITS WHICH CROSS EACH OTHER

(71) Applicant: C.R.F. SOCIETÀ CONSORTILE PER AZIONI, Orbassano (IT)

(72) Inventors: Raffaele Ricco, Orbassano (IT); Sergio Stucchi, Orbassano (IT); Marcello Gargano, Orbassano (IT); Onofrio De Michele, Orbassano (IT); Chiara Altamura, Orbassano (IT)

(73) Assignee: C.R.F. SOCIETÀ CONSORTILE PER AZIONI, Orbassano (IT)

( * ) Notice: Subject to any disclaimer, the term of this patent is extended or adjusted under 35 U.S.C. 154(b) by 0 days.

(21) Appl. No.: 18/708,390

(22) PCT Filed: Nov. 14, 2022

(86) PCT No.: PCT/IB2022/060915
§ 371 (c)(1),
(2) Date: May 8, 2024

(87) PCT Pub. No.: WO2023/089464
PCT Pub. Date: May 25, 2023

(65) Prior Publication Data
US 2025/0020072 A1    Jan. 16, 2025

(30) Foreign Application Priority Data
Nov. 16, 2021   (EP) ..................................... 21208408

(51) Int. Cl.
*F01L 13/00*     (2006.01)
*F01L 1/25*      (2006.01)
(Continued)

(52) U.S. Cl.
CPC ............. *F01L 13/0005* (2013.01); *F01L 1/25* (2013.01); *F01L 1/267* (2013.01); *F01L 9/14* (2021.01);
(Continued)

(58) Field of Classification Search
CPC ... F01L 1/053; F01L 1/25; F01L 1/267; F01L 1/38; F01L 1/462; F01L 9/14; F01L 9/40;
(Continued)

(56) References Cited

U.S. PATENT DOCUMENTS 10,907,551 B2   2/2021   McAllister
2013/0133596 A1*  5/2013  Stucchi ............... F16K 31/0624
                                              123/90.11
(Continued)

FOREIGN PATENT DOCUMENTS

EP    3832077 A1   6/2021
GB    2578222 A    4/2020

OTHER PUBLICATIONS

EPO International Search Report and Written Opinion dated Feb. 21, 2023, 12 pages.

*Primary Examiner* — Jorge L Leon, Jr.
(74) *Attorney, Agent, or Firm* — Heslin Rothenberg Farley & Mesiti P.C.; Victor A. Cardona, Esq.

(57) ABSTRACT

An internal-combustion engine has a plurality of cylinders each with two intake valves driven by respective pumping pistons operatively associated to cams of a camshaft, by respective hydraulic circuits. The hydraulic has its pressure chamber communicating with hydraulic actuators of the two intake valves, so that the two intake valves of each cylinder are controlled, via two different hydraulic circuits, by cams associated to two different cylinders. Each cam is configured to give rise to a cycle of opening and closing of each of the intake valves in an angular range of rotation of the crank-
(Continued)

shaft less than 180° such that, in each operating cycle of a cylinder, only the first intake valve initially opens and closes while the second intake valve remains closed, and then the second intake valve opens and closes while the first intake valve remains closed.

5 Claims, 8 Drawing Sheets

(51) Int. Cl.
*F01L 1/26* (2006.01)
*F01L 9/14* (2021.01)
*F01L 9/40* (2021.01)
*F02D 13/02* (2006.01)
*F01L 1/053* (2006.01)
*F01L 1/38* (2006.01)
*F01L 1/46* (2006.01)

(52) U.S. Cl.
CPC ............ *F01L 9/40* (2021.01); *F02D 13/0226* (2013.01); *F02D 13/0257* (2013.01); *F01L 1/053* (2013.01); *F01L 1/38* (2013.01); *F01L 1/462* (2013.01); *F01L 2201/00* (2013.01); *F01L 2800/06* (2013.01); *F01L 2820/031* (2013.01)

(58) Field of Classification Search
CPC ............... F01L 13/0005; F01L 2201/00; F01L 2800/06; F01L 2820/031; F02D 13/0226; F02D 13/0257
USPC .......... 123/90.12, 90.16, 90.27, 90.48, 90.65
See application file for complete search history.

(56) References Cited

U.S. PATENT DOCUMENTS

2019/0345880 A1* 11/2019 McAllister ............... F02B 31/04
2020/0149437 A1* 5/2020 Shelby .................... F02B 75/20

* cited by examiner

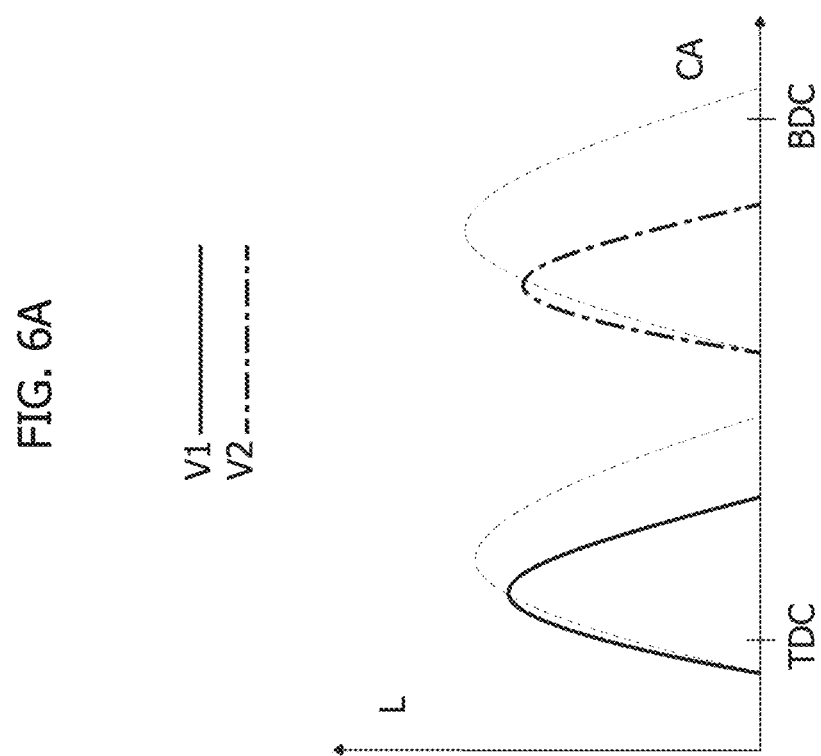

US 12,247,502 B2

MULTI-CYLINDER INTERNAL COMBUSTION ENGINE, WITH CYLINDERS EQUIPPED WITH INTAKE VALVE VARIABLE ACTUATION SYSTEMS HAVING HYDRAULIC CIRCUITS WHICH CROSS EACH OTHER

CROSS REFERENCE TO RELATED APPLICATIONS

This application is a national stage filing under Section 371 of International Application No. PCT/IB2022/060915, filed Nov. 14, 2022, published in English on May 25, 2023, as WO 2023/089464 A1 and which claims priority from European Patent Application No. 21208408.1 filed on Nov. 16, 2021, the entire disclosures of which are incorporated herein by reference.

FIELD OF THE INVENTION

The present invention relates to internal-combustion engines of the type comprising:
- a plurality of cylinders and a plurality of pistons movable in the cylinders and operatively associated with a crankshaft, wherein the engine cylinders have respective operating cycles distributed in sequence along the time;
- a first intake valve and a second intake valve associated with each engine cylinder, for controlling a flow of intake air respectively from a first intake duct and from a second intake duct of the cylinder during an intake stage of the cylinder in each operating cycle of the cylinder; and
- a camshaft driven by the crankshaft, with a plurality of cams associated with respective engine cylinders and configured for driving the intake valves of the engine by means of respective tappets,
- wherein the intake valves of the engine cylinders are governed by said tappets, against the action of respective return springs, by interposition of a plurality of hydraulic circuits associated with respective engine cylinders, and
- wherein the hydraulic circuit associated with each engine cylinder includes:
- a pumping piston, which is driven by the tappet associated with the respective engine cylinder and is configured for transferring pressurized-fluid, through a pressure chamber, towards two hydraulic actuators associated with respective intake valves of the engine; and
- an electrically actuated control valve able to set said pressurized-fluid chamber in communication with a low-pressure exhaust channel, which communicates with a pressurized-fluid accumulator, in such a way that, when said control valve is opened, pressurized fluid is discharged from the pressure chamber into said low-pressure channel and the intake valves controlled by said hydraulic circuit close due to the action of the respective return springs, independently of the action of the respective cam.

Engines of this type are described, for example, in the documents EP 0 803 642 B1, EP 1 555 398, EP 1 508 676 B1, EP 1 674 673 B1, and EP 2 261 471 A1 filed in the name of the present applicant.

PRIOR ART

For some time now, the present applicant has developed internal-combustion engines comprising a system for variable actuation of the intake valves of the type referred to above, marketed under the trademark "MULTIAIR". The present applicant is the holder of a large number of patents and patent applications regarding engines equipped with a system of the type specified above.

FIG. 1 of the annexed drawings is a cross-sectional view of an engine equipped with the MULTIAIR system, as described in the European patent EP 0 803 642 B1.

With reference to FIG. 1, the engine illustrated therein is a multicylinder engine, for example an engine with four cylinders in line, comprising a cylinder head 1. The cylinder head 1 includes, for each cylinder, a cavity 2 formed by the base surface 3 of the cylinder head 1 and defining the combustion chamber, giving out into which are two intake ducts 4, 5 and two exhaust ducts 6. Communication of the two intake ducts 4, 5 with the combustion chamber 2 is controlled by two intake valves 7 of the traditional mushroom type, each comprising a stem 8 slidably mounted in the body of the cylinder head 1.

Each valve 7 is recalled towards the closing position by springs 9 set between an inner surface of the cylinder head 1 and an end retainer 10 of the valve. Communication of the two exhaust ducts 6 with the combustion chamber is controlled by two valves 70, which are also of a traditional type, associated with which are springs 9 for return towards the closed position.

Opening of each intake valve 7 is controlled, in the way that will be described in what follows, by a camshaft 11, which is rotatably mounted about an axis 12 within supports of the cylinder head 1 and comprises a plurality of cams 14 for actuation of the intake valves 7.

Each cam 14 that controls an intake valve 7 co-operates with the cap 15 of a tappet 16 mounted so that it can slide along an axis 17 that, in the case of the example illustrated in the prior document referred to, is oriented substantially at 90° with respect to the axis of the valve 7. The cap 15 is recalled against the cam 14 by a spring associated thereto. The tappet 16 constitutes a pumping piston slidably mounted within a bushing 18 carried by a body 19 of a pre-assembled unit 20, which incorporates all the electrical and hydraulic devices associated with actuation of the intake valves, according to what will be described in detail hereinafter.

The pumping piston 16 is able to transmit a thrust to the stem 8 of the valve 7 so as to bring about opening of the latter against the action of the elastic means 9 via pressurized fluid (preferably oil coming from the lubricating circuit of the engine) present in a pressure chamber C, facing which is the pumping piston 16, and via a piston 21 slidably mounted in a cylindrical body constituted by a bushing 22 that is also carried by the body 19 of the subunit 20.

Once again in the known solution illustrated in FIG. 1, the pressurized-fluid chamber C associated with each intake valve 7 can be set in communication with an exhaust channel 23 via a solenoid valve 24. The solenoid valve 24, which may be of any known type suitable for the purpose illustrated herein, is controlled by electronic control means, represented schematically and designated by 25, as a function of signals S indicating operating parameters of the engine, such as the position of the accelerator and the engine speed.

When the solenoid valve 24 is open, the chamber C enters into communication with the channel 23 so that the pressurized fluid present in the chamber C flows in the aforesaid channel, and there is obtained an uncoupling of the cam 14 and of the respective tappet 16 from the intake valve 7, which thus rapidly returns into its closing position under the action of the return springs 9. By controlling the communication between the chamber C and the exhaust channel 23, it is consequently possible to vary as desired the opening time and the opening stroke of each intake valve 7.

The exhaust channels 23 of the various solenoid valves 24 all give out into one and the same longitudinal channel 26 communicating with pressure accumulators 27, just one of which is visible in FIG. 1.

All the tappets 16 with their associated bushings 18, the pistons 21 with their associated bushings 22, the solenoid valves 24, and the corresponding channels 23, 26 are carried by and obtained from the aforesaid body 19 of the pre-assembled unit 20, with consequent advantage in terms of rapidity and ease of assembly of the engine.

The exhaust valves 70 associated with each cylinder are controlled, in the embodiment illustrated in FIG. 1, in a traditional way, by a respective camshaft 28, via respective tappets 29, albeit in principle not excluded, in the case of the prior document referred to, is application of the hydraulic-actuation system also for driving the exhaust valves.

Once again with reference to FIG. 1, the variable-volume chamber defined within the bushing 22 and facing the piston 21 (which in FIG. 1 is illustrated in its condition of minimum volume, the piston 21 being in its top end-of-travel position) communicates with the pressurized-fluid chamber C via an opening 30 provided in an end wall of the bushing 22. This opening 30 is engaged by an end nose 31 of the piston 21 in such a way as to provide a hydraulic braking of the movement of the valve 7 during closing, when the valve is close to the closing position, in so far as the oil present in the variable-volume chamber is forced to flow in the pressurized-fluid chamber C passing through the clearance existing between the end nose 31 and the wall of the opening 30 engaged thereby. In addition to the communication constituted by the opening 30, the pressurized-fluid chamber C and the variable-volume chamber of the piston 21 communicate with one another via internal passages provided in the body of the piston 21 and controlled by a non-return valve 32 that enables passage of fluid only from the pressurized chamber C to the variable-volume chamber of the piston 21.

During normal operation of the known engine illustrated in FIG. 1, when the solenoid valve 24 excludes communication of the pressurized-fluid chamber C with the exhaust channel 23, the oil present in the aforesaid chamber transmits the movement of the pumping piston 16, imparted by the cam 14, to the piston 21 that drives opening of the valve 7. In the initial step of the movement of opening of the valve, the fluid coming from the chamber C reaches the variable-volume chamber of the piston 21 passing through the non-return valve 32 and further passages that set in communication the internal cavity of the piston 21, which has a tubular conformation, with the variable-volume chamber. After a first displacement of the piston 21, the nose 31 exits from the opening 30, so that the fluid coming from the chamber C can pass directly into the variable-volume chamber through the opening 30, which is now free.

In the reverse movement of closing of the valve, as has already been said, during the final step the nose 31 enters the opening 30, causing hydraulic braking of the valve, so as to prevent any impact of the body of the valve against its seat, for example following upon an opening of the solenoid valve 24 that causes immediate return of the valve 7 into the closing position.

In the system described, when the solenoid valve 24 is activated, the engine valve follows the movement of the cam (full lift). An early closing of the valve may be obtained by deactivating (opening) the solenoid valve 24 so as to empty the hydraulic chamber and obtain closing of the engine valve under the action of the respective return springs. Likewise, a late opening of the valve may be obtained by delaying activation of the solenoid valve, whereas the combination of a late opening with an early closing of the valve may be obtained with activation and deactivation of the solenoid valve during the thrust of the corresponding cam. According to an alternative strategy, in conformance with the teachings of the patent application EP 1 726 790 A1 filed in the name of the present applicant, each intake valve can be governed in multi-lift mode, i.e., according to two or more repeated subcycles of opening and closing. In each subcycle, the intake valve opens and then closes completely. The electronic control unit is consequently able to obtain a variation of the instant of opening and/or of the instant of closing and/or of the lift of the intake valve as a function of one or more operating parameters of the engine. This enables maximum efficiency of the engine to be obtained, and the lowest fuel consumption in every operating condition.

FIG. 2 of the annexed drawings corresponds to FIG. 6 of EP 1 674 673 and shows the scheme of the system for actuating the two intake valves associated with each cylinder, in a conventional MULTIAIR system. FIG. 2 shows two intake valves 7 associated with one and the same cylinder of an internal-combustion engine, which are controlled by a single pumping piston 16 in turn governed by a single cam of the engine camshaft (not illustrated) that acts against its cap 15. FIG. 2 does not show the return springs 9 (see FIG. 1) that are associated with the valves 7 and tend to bring them back into their respective closing positions.

As may be seen, in the conventional system of FIG. 2, a single pumping piston 16 controls the two valves 7 via a single pressure chamber C, communication of which with the exhaust is controlled by a single solenoid valve 24 and which is in hydraulic communication with both of the variable-volume chambers C1, C2, facing the pistons 21 for driving the two valves.

The above solution presents evident advantages of smaller dimensions on the cylinder head, and of lower cost and lower complexity of the system as compared to a solution that envisages one cam and one solenoid valve for each intake valve of each cylinder.

The system of FIG. 2 is able to operate in an efficient and reliable way, above all in the case where the volumes of the hydraulic chambers are relatively small. This possibility is afforded by the adoption of hydraulic tappets 400 on the outside of the bushings 22, according to what has already been illustrated in detail, for example in the document EP 1 674 673 B1 filed in the name of the present applicant. In this way, the bushings 22 can have an internal diameter that may be chosen as small as desired.

FIG. 3 of the annexed drawings is a schematic representation of the system illustrated in FIG. 2, where it is evident that both of the intake valves 7 associated with each engine cylinder have their actuators 21 permanently in communication with the pressure chamber C, which in turn can be set isolated or connected with respect to the exhaust channel 23 via the single solenoid valve 24.

The solution illustrated in FIGS. 2, 3 enables obvious advantages at the level of simplicity and economy of construction, and from the standpoint of reduction of the overall dimensions, as compared to the solution illustrated, for example, in the document EP 0 803 642 B1, which envisages two solenoid valves to govern the two intake valves of each cylinder separately.

On the other hand, the known solution illustrated above rules out the possibility of differentiating control of the intake valves of each cylinder. This differentiation is instead desired. For example, in the case of diesel engines, where each cylinder is provided with two intake valves associated with respective intake ducts having conformations different from one another, a differentiated control of the intake valves enables generation of different movements of the flow of air introduced into the cylinder (see, for example, FIG. 5 of EP 1 508 676 B1). Typically, in such engines the two intake ducts of each cylinder are shaped so as to optimize flows of the tumble type and of the swirl type, respectively, inside the cylinder, these motions being fundamental for optimal distribution of the air charge inside the cylinder, substantially depending upon which is the possibility of reducing the pollutant emissions at the exhaust. In controlled-ignition engines, instead, a differentiated control of the two intake valves of each cylinder is desired at low engine loads both to optimize the coefficients of outflow of air through the intake valves and reduce accordingly the pumping cycle and to optimize the range of motion of the air inside the cylinder during the intake stage.

As has been said, in conventional MULTIAIR systems it is not possible to control the two intake valves of each cylinder independently. It would, instead, be desirable to be able to increase each time the fraction of air charge introduced with tumble-type motion and the fraction of air charge introduced with swirl-type motion according to the operating conditions of the engine (engine speed, engine load, cold starting, etc.). Likewise, in a controlled-ignition engine, in particular when this works at partial engine loads or in the idling condition, there arises the problem of having to introduce a small air charge with a sufficient kinetic energy that will favour setting-up of an optimal range of motion for combustion inside the cylinder. In these working conditions, it would consequently be preferable for the entire mass of air to be introduced by just one of the two intake valves in order to reduce the dissipative losses as it passes through the valve itself. In other words, once the mass of air that has to be introduced into the combustion chamber and the pressure in the intake manifold are fixed, and given the same evolution of the suction pressure generated by the motion of the piston in the combustion chamber, there are lower dissipative losses (and hence a higher kinetic energy) for the mass of air introduced by just one intake valve having a lift that is equal to 2·h as compared to the case of the same mass of air introduced by two intake valves having a lift equal to h.

To enable differentiated control of the two intake valves of each cylinder, the present applicant has proposed an improvement of the MULTIAIR system that formed the subject of the document EP 2 597 276 A1. FIG. 4 is a schematic illustration of this known system.

With reference to FIG. 4, in this case the two intake valves 7A, 7B associated with each engine cylinder are not both permanently connected to the pressurized-fluid chamber C. Only the intake valve 7B has its hydraulic actuator 21 permanently communicating with the pressurized-fluid chamber C. Moreover, the two-way, two-position solenoid valve 24 is replaced by a three-way, three-position solenoid valve, having one inlet i permanently communicating with the pressurized-fluid chamber C and with the hydraulic actuator of the intake valve 7B, and two outlets u1, u2. The outlet u1 is permanently in communication with the hydraulic actuator 21 of the intake valve 7A, whereas the outlet u2 is permanently connected to the exhaust channel 23 and to the hydraulic accumulator 270.

FIG. 4 illustrates the solenoid valve in its first operating position P1, corresponding to a condition de-energized by its solenoid. In this position, the inlet i is in communication with both of the outlets u1, u2, so that the hydraulic actuators of both of the intake valves 7A, 7B, as well as the pressurized-fluid chamber C, are in communication with the exhaust channel 23 and the accumulator 270 so that both of the valves are uncoupled from the tappet and kept closed by the respective return springs.

In a second position P2 of the solenoid valve, corresponding to a first level of excitation of the solenoid, the inlet i is in communication with the outlet u1, whereas the communication between the inlet i and the outlet u2 is interrupted. Consequently, in this condition, the actuators of both of the intake valves 7A, 7B are in communication with the pressure chamber C, and the latter is isolated from the exhaust channel 23 so that both of the intake valves are active and sensitive to the movement of the respective tappet.

In a third position P3 of the solenoid valve, corresponding to a second level of excitation, higher than the first level of excitation, the inlet i is isolated from both of the outlets u1, u2 so that the pressurized-fluid chamber C is isolated from the exhaust environment 23 and the intake valve 7B is consequently active and sensitive to the movement of the respective tappet, while in this condition the actuator of the intake valve 7A is isolated both from the pressurized-fluid chamber (so that it is consequently uncoupled from the movements of the respective tappet) and from the exhaust environment 23.

In the prosecution of its studies regarding systems designed to improve the combustion efficiency, the present applicant has also proposed in its European patent application EP 21 157 310.0 dated Feb. 16, 2021 (still secret at the date of filing of the present invention) an internal-combustion engine having two intake valves for each cylinder, where during each cycle of each cylinder first of all a cycle of opening and closing of just one first intake valve is activated, while the second intake valve remains closed, and then a cycle of opening and closing of just the aforesaid second intake valve is activated, while the first intake valve remains closed. A solution of this type has proven particularly effective for increasing the turbulence kinetic energy (TKE) within the combustion chamber, with consequent increase in the combustion efficiency and reduction of the noxious emissions at the exhaust.

There is, however, felt the need for further improvements in this field.

An internal combustion engine according to the preamble of claim 1 is known from EP 3 832 077 A1 and from EP 2 597 276 B1, both in the name of the present applicant.

OBJECT OF THE INVENTION

The main object of the present invention is to provide a multicylinder internal-combustion engine, where associated with each cylinder are two intake valves and where the two intake valves of each cylinder can be controlled in a differentiated way.

In particular, an object of the invention is to provide an internal-combustion engine in which the two intake valves of each cylinder can be opened and closed at successive times during the intake stage of each operating cycle of the cylinder.

A further object of the invention is to implement the aforesaid aims in an internal-combustion engine equipped with a system for variable actuation of the intake valves of the type referred to above.

Yet a further object of the invention is to achieve the aforesaid aims with simple means having a relatively low cost.

SUMMARY OF THE INVENTION

With a view to achieving one or more of the aforesaid objects, the subject of the invention is a four-stroke internal-combustion engine with four cylinders in line, or a two-cylinder two-stroke internal combustion engine, comprising the features of claim 1. The invention is also directed to the method of claim 6.

The invention thus makes it possible to obtain in a simple way opening and closing at successive times of the two intake valves of each cylinder.

As will be illustrated in greater detail in what follows, the electrically actuated control valve forming part of the hydraulic circuit associated with each engine cylinder may be either of the two-way, two-position type or of the three-way, three-position type, according to techniques in themselves known, already discussed above, proposed in the past by the present applicant.

DETAILED DESCRIPTION OF PREFERRED EMBODIMENTS

Further characteristics and advantages of the invention will emerge from the ensuing description with reference to the annexed drawings, which are provided purely by way of non-limiting example and in which:

FIG. 6A shows a lift diagram of the intake valves of a cylinder in early-closing mode implemented by the system of FIG. 6;

FIGS. 1-4, which regard the systems of the prior art, have already been discussed above.

Figure 5:
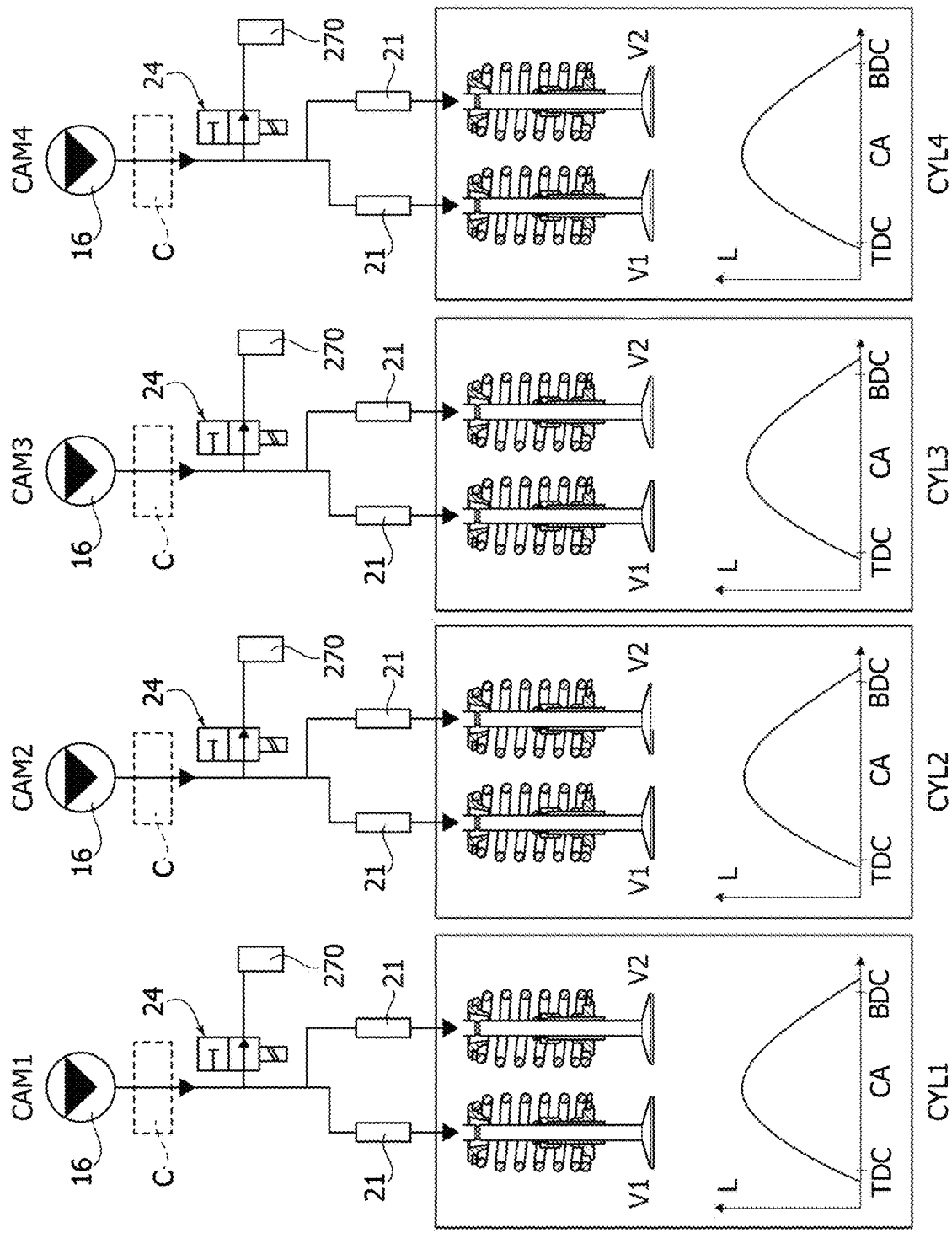
FIG. 5 is a further schematic view that again illustrates the MULTIAIR system according to the prior art, where the four hydraulic circuits associated with the four cylinders of a four-cylinder internal-combustion engine are illustrated.

FIG. 5 also regards the prior art and illustrates the four hydraulic circuits associated with the four cylinders of a four-cylinder internal-combustion engine, equipped with the MULTIAIR system mentioned above. With reference to FIG. 5, associated with each of the four engine cylinders CYL 1, CYL 2, CYL 3, and CYL 4 are two intake valves V1, V2.

Associated with the four engine cylinders are, respectively, four cams CAM 1, CAM 2, CAM 3, and CAM 4 for actuation of the engine intake valves.

Figure 1:
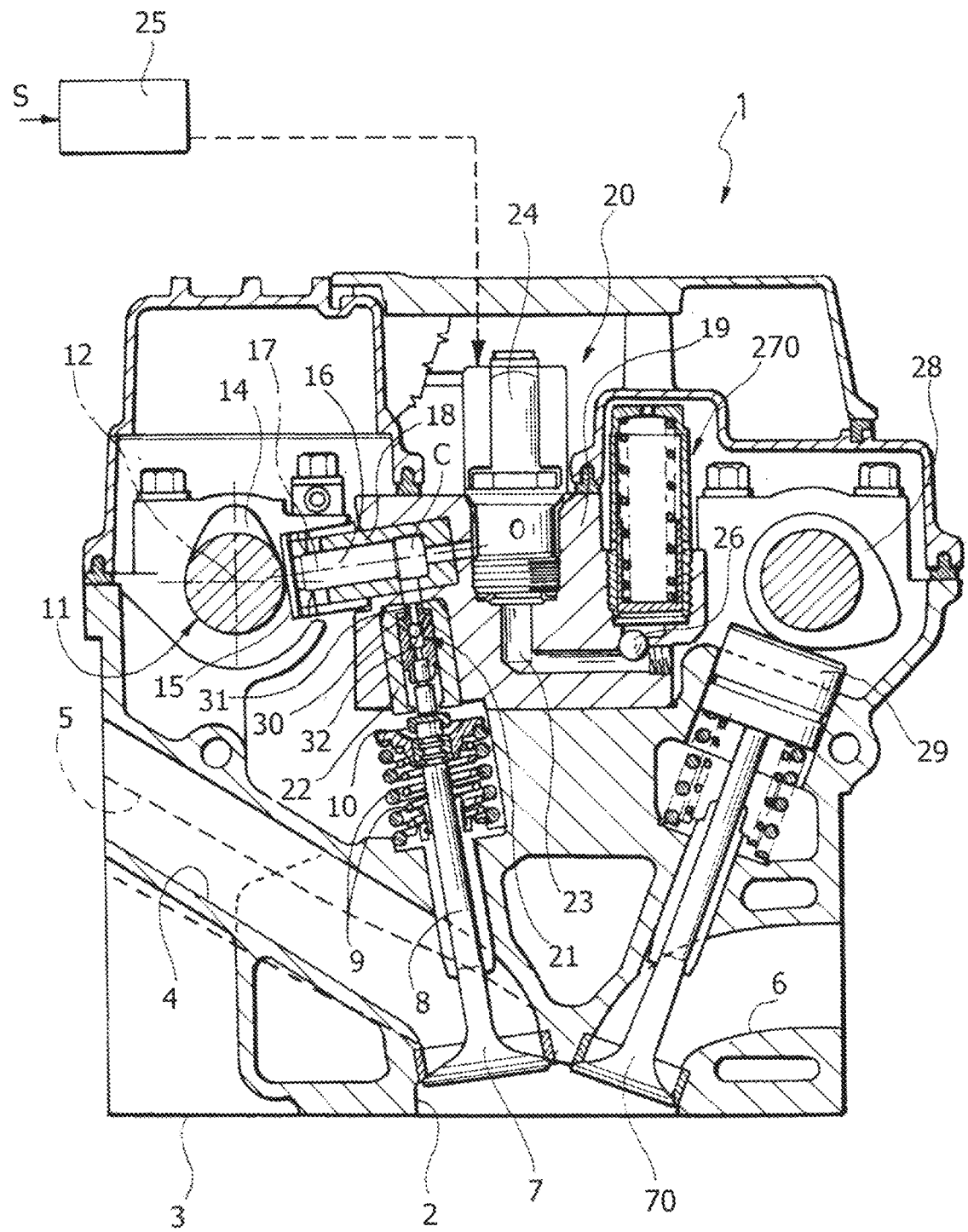
FIG. 1 is a cross-sectional view of a cylinder head of an internal-combustion engine equipped with a MULTIAIR system according to the prior art described, for example, in the document EP 0 803 642 B1.
Figure 2:
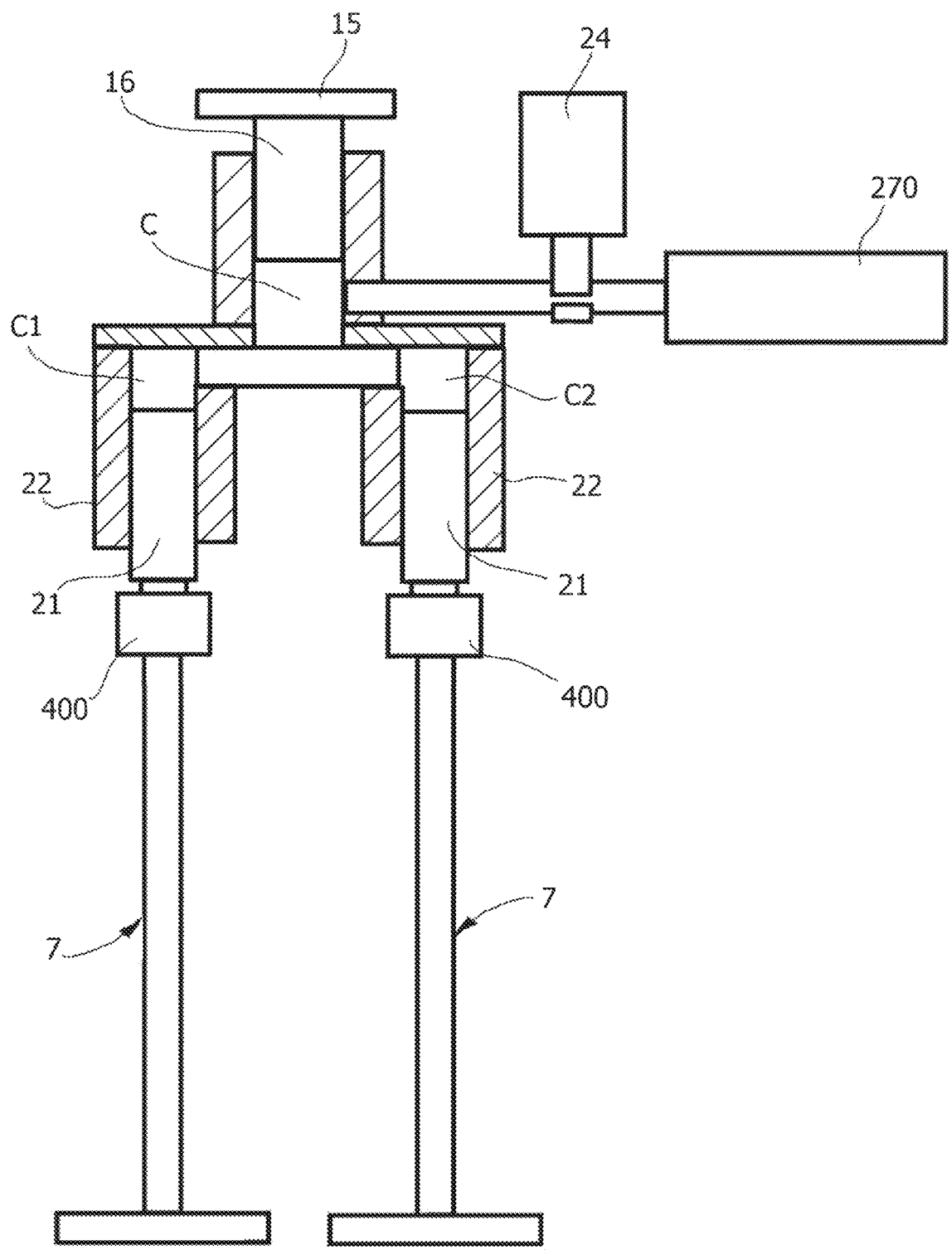
FIG. 2 is a scheme of the MULTIAIR system according to the prior art, as illustrated in the document EP 1 674 673 B1.

Associated with each of the four cams is a respective tappet 15 with the respective pumping piston 16 (see FIGS. 1 and 2). In FIG. 5 the pumping piston 16 associated with each cam is illustrated schematically (as in FIGS. 3 and 4).

Figure 3:
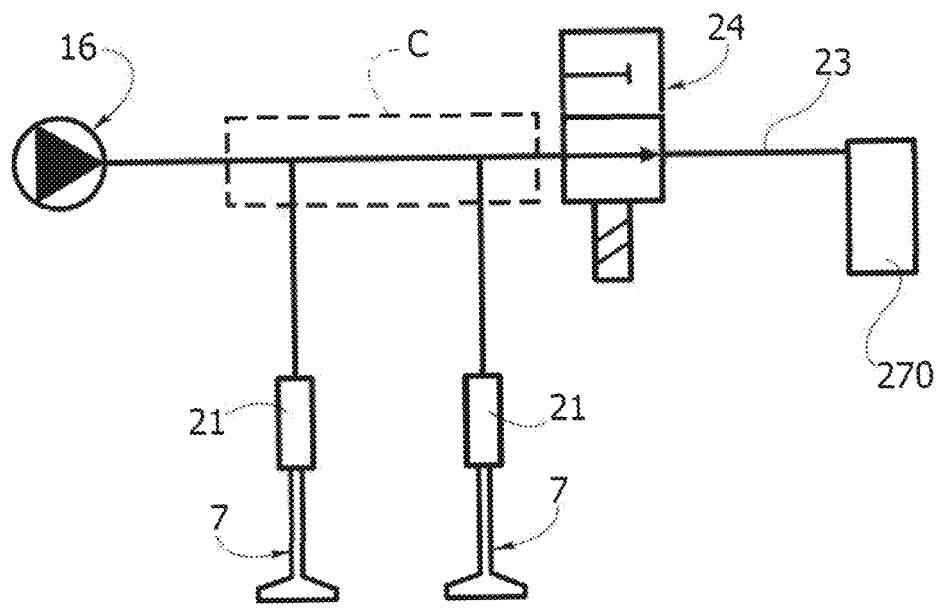
FIG. 3 is a further schematic view of the known system of FIG. 2.

In the known solution illustrated in FIG. 5, the electrically actuated control valve 24 associated with the hydraulic circuit of each cylinder is a two-way, two-position solenoid valve, as in the case of FIG. 3. When each solenoid valve 24 is in the open position (illustrated in FIG. 5) the pressure chamber C of each hydraulic circuit is in communication with the low-pressure environment and with the respective fluid accumulator 270, so that the valves V1, V2 are insensitive to the movement of the respective cam and remain constantly closed. When each solenoid valve 24 is in its closed position, the pressure chamber C of each hydraulic circuit is isolated from the low-pressure environment and with respect to the accumulator 270 so that the movement of each cam causes, following upon transfer of fluid from the pumping piston 16 to the hydraulic actuators 21, opening of the two intake valves V1, V2 of each cylinder.

In the schematic illustration of FIG. 5, represented in the block corresponding to each cylinder is the diagram of the lift L of both of the intake valves V1, V2 as a function of the crank angle CA.

In the aforesaid known solution, both of the intake valves V1, V2 of each engine cylinder open and close simultaneously in the condition where the solenoid valve 24 closes following a conventional lift profile that starts in the proximity of top dead centre (TDC) and ends in the proximity of bottom dead centre (BDC). The cam of each cylinder consequently presents a conventional profile such as to generate the aforesaid lift profile.

Figure 6:
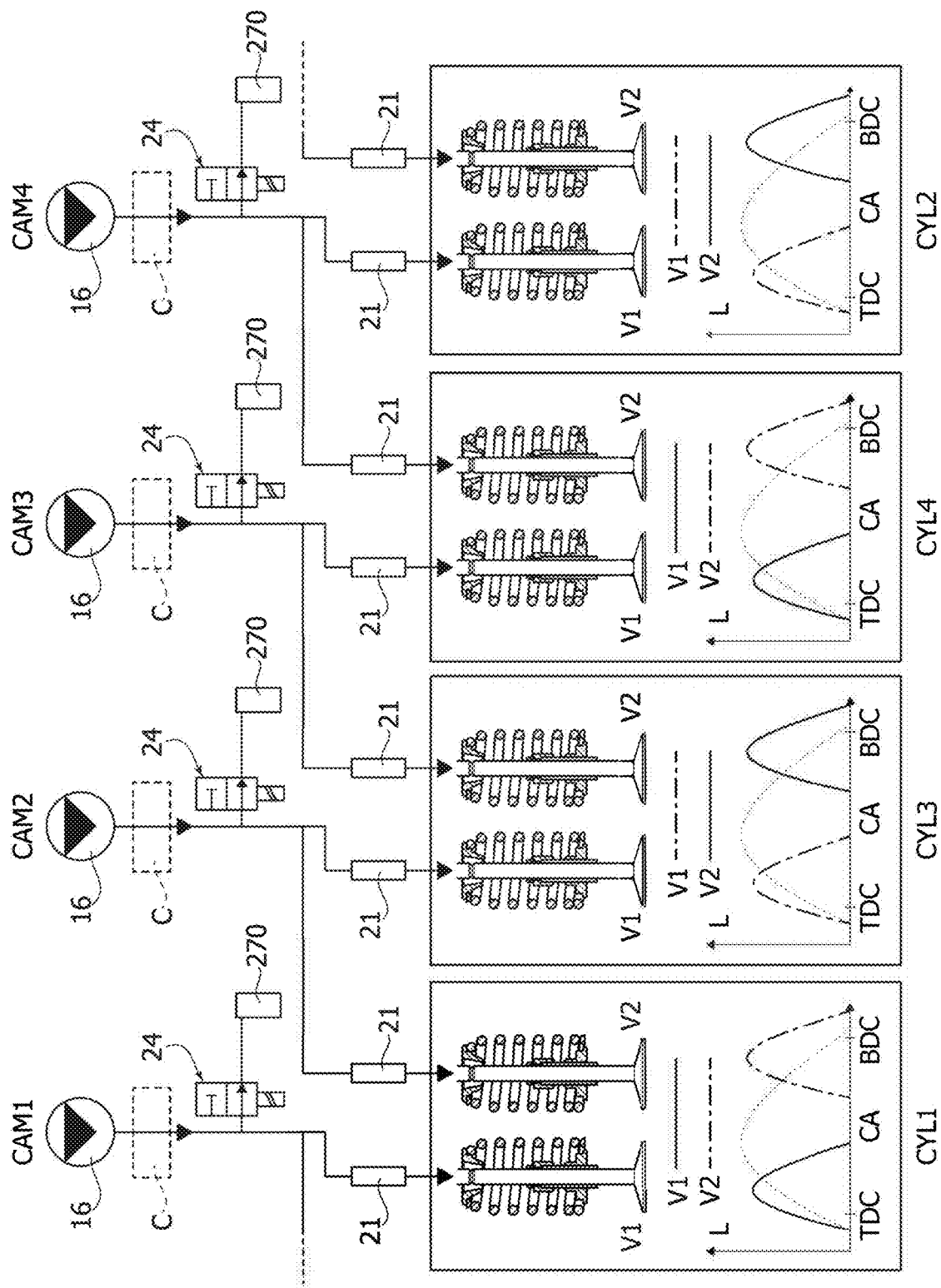
FIG. 6 is a schematic illustration of a first embodiment of the invention similar to that of FIG. 5.

As already described above, in the system of FIG. 5, both of the intake valves of each cylinder may have lift profiles that are always identical to one another, but both modified with respect to the full-lift profile by controlling opening of the solenoid valves 24, for example in such a way as to cause a late opening (late-opening mode) or an early closing (early-closing mode) or multiple cycles of opening and closing (multi-lift mode) of both of the intake valves, the different modes being implemented by the electronic controller as a function of the operating conditions of the engine FIG. 6 shows how the scheme of FIG. 5 changes in the case of a first embodiment of the invention, which once again regards a four-stroke, four-cylinder internal-combustion engine. In FIG. 6, the parts in common with those of FIG. 5 are designated by the same references. However, for reasons that will emerge clearly from what follows, in FIG. 6 the blocks corresponding to the four cylinders have been represented from left to right in the succession 1-3-4-2, which corresponds to the conventional succession of the operating cycles in the cylinders of an engine with four cylinders in line (in a conventional representation, where the cylinders are numbered from 1 to 4, from one end to the other of the engine). Consequently, in FIG. 6, also the cams that are associated with the four cylinders are illustrated in the aforesaid succession 1-3-4-2.

Apart from the different order in which the cylinders are illustrated in FIG. 6 with respect to the order illustrated in FIG. 5 (which, as will be seen, is due to the need for a greater ease of representation of the solution according to the invention), the main difference in the solution of FIG. 6 from that of FIG. 5 lies in the fact that in the case of FIG. 6 the pressure chamber C associated with each pumping piston 16 communicates with the hydraulic actuators 21 of two intake valves V1, V2 associated with two different engine cylinders. Consequently, the two intake valves V1, V2 of each engine cylinder are controlled, via two different hydraulic cylinders, by pumping pistons 16 associated with two different cams of the engine camshaft.

With reference in particular to FIG. 6, the pressure chamber C associated with the cam CAM 2 communicates with the hydraulic actuators of the intake valve V1 of the cylinder CYL 3 and with the intake valve V2 of the cylinder CYL 1.

The pressure chamber C associated with the cam CAM 3 communicates with the hydraulic actuators 21 of the intake valve V1 of the cylinder CYL 4 and of the intake valve V2 of the cylinder CYL 3.

The pressure chamber C associated with the cam CAM 4 communicates with the hydraulic actuators 21 of the intake valve V1 of the cylinder CYL 2 and of the intake valve V2 of the cylinder CYL 4.

Finally, the pressure chamber C associated with the cam CAM 1 communicates with the hydraulic actuators 21 of the intake valve V1 of the cylinder CYL 1 and of the intake valve V2 of the cylinder CYL 2.

Hence, as may be seen, the cam associated with a given engine cylinder controls, by means of the respective hydraulic circuit, a first intake valve associated with said given engine cylinder and a second intake valve that, instead, is associated with the cylinder that immediately precedes said given engine cylinder in the succession of the operating cycles of the engine cylinders. It is for this reason that in FIG. 6 the cylinders have been illustrated in the order in which their operating cycles follow one another so as to be able to represent easily the connection of each hydraulic circuit to the hydraulic actuators of the intake valves of different cylinders.

As a consequence of the arrangement described above, the two intake valves V1, V2 of one and the same engine cylinder are designed to have, during a conventional intake stage in each operating cycle of the cylinder, respective opening and closing cycles in different angular ranges of the rotation of the crankshaft.

The above situation emerges clearly from the diagrams in the lower part of FIG. 6. In each of these diagrams, there appears the lift L of the first intake valve V1 and of the second intake valve V2 as a function of the crank angle CA. Each diagram also shows the conventional lift diagram of the known system illustrated in FIG. 5 (with a dashed line).

The diagrams illustrated in FIG. 6 refer to the case where the solenoid valves 24 are all in a closed condition in such a way that the pressure chamber C of each of the four hydraulic circuits will be isolated from the low-pressure environment. In this condition, each of the two intake valves V1, V2 of each cylinder has a lift diagram that extends for a small angular range of the rotation of the crankshaft, of much less than 180°. This result is obtained in so far as the cam associated with each cylinder has a corresponding configuration, reduced with respect to the conventional configuration.

As a result of the crosswise arrangement of the hydraulic circuits of the various cylinders, and as a result of the aforesaid conformation of the cams, in each cylinder the first intake valve opens in the proximity of top dead centre TDC and closes substantially after a rotation of 90° of the crankshaft, hence long before bottom dead centre BDC. The second intake valve V2 opens—with reference to this example of embodiment—long after closing of the first intake valve and closes with a certain delay with respect to bottom dead centre BDC. As has been mentioned, the diagrams of FIG. 6 refer to the case where both of the intake valves have a full lift in so far as the solenoid valves 24 remain closed during the entire active phase of each cam that brings about opening of the intake valves.

Of course, by exploiting the possibilities afforded by the variable-actuation system, it is possible to obtain that each of the intake valves of each engine cylinder has a reduced lift diagram as compared to the full-lift diagram, as illustrated in FIG. 6A. This figure regards the case where, during the active phase of each cam of the engine, where the cam would cause opening of the respective intake valves, the solenoid valve 24 associated with said cam will be brought into an open condition so as to set the respective pressure chamber C in communication with the low-pressure environment and cause closing of the intake valves controlled by said cam in advance with respect to the full-lift profile (early-closing mode).

Figure 4:
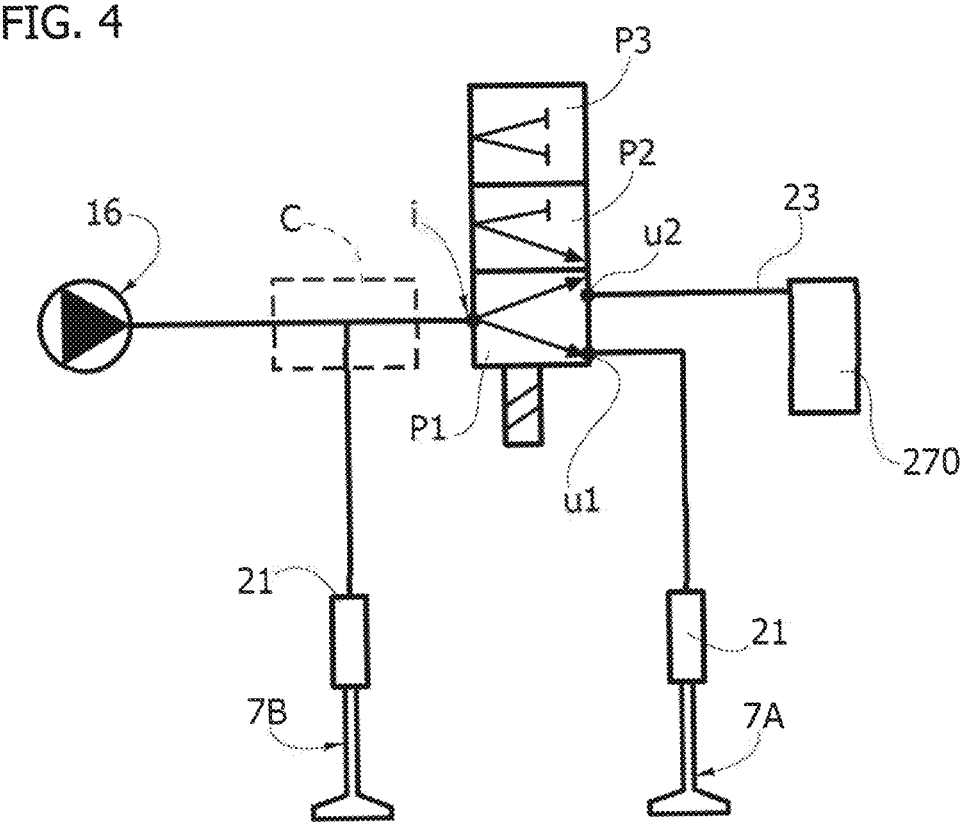
FIG. 4 is a further schematic view of a system known from the document EP 2 801 706 B1.
Figure 7:
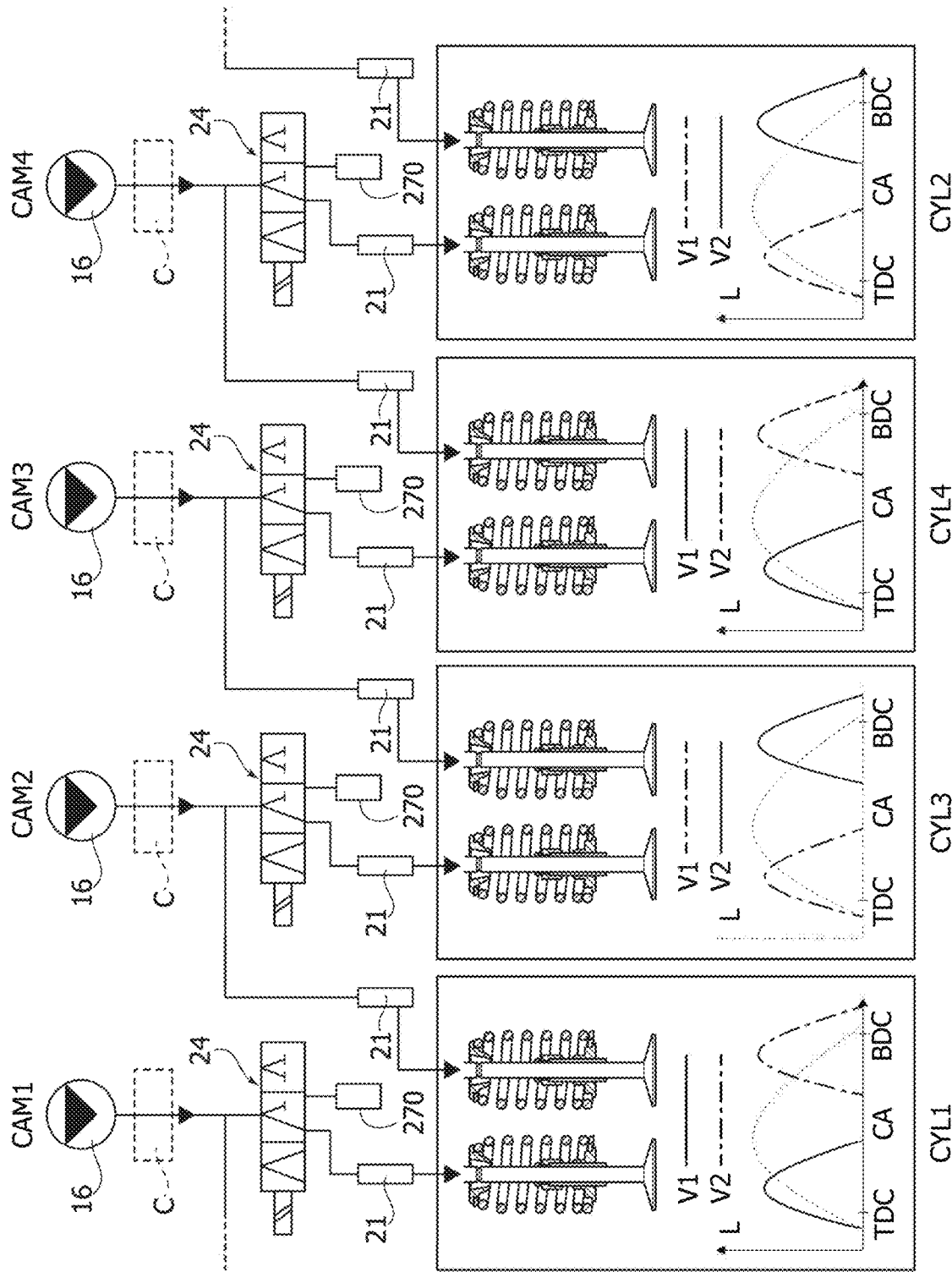
FIG. 7 is once again a schematic illustration of a second embodiment of the invention.

FIG. 7 illustrates a second embodiment of the invention that differs from the first embodiment merely in that the electrically actuated control valves that are associated with the hydraulic circuits of the engine cylinders are three-way, three-position solenoid valves of the type in itself known illustrated in FIG. 4.

In the schematic illustration of FIG. 7, the three-position solenoid valves 24 are illustrated in their intermediate operating condition where the pressure chamber C associated with each cam is in communication with both of the intake valves controlled thereby and is instead isolated from the low-pressure environment. In this condition, operation of the system is altogether similar to what has been described with reference to FIG. 6.

In the case where the three-position solenoid valves 24 are brought into the operating condition corresponding to the left-hand section of each solenoid valve (with reference to FIG. 7), the pressure chamber C associated with each cam is always in communication with both of the hydraulic actuators of the two intake valves controlled thereby, but at the same time is also in communication with the low-pressure environment and with the respective fluid accumulator 270. In this situation, both of the intake valves controlled by said cam remain closed, even when the cam would tend to bring about opening thereof.

Figure 7B:
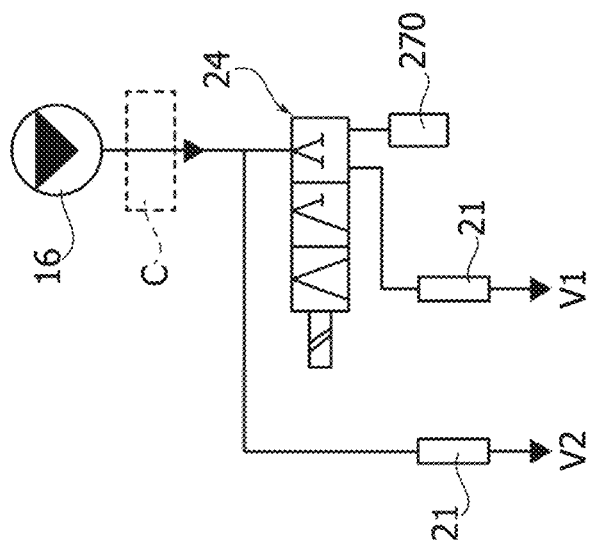
FIG. 7B shows a detail of FIG. 7 in the operating condition that gives rise to the mode of actuation of the intake valves that is illustrated in FIG. 7A.

Finally, when each three-position solenoid valve 24 is in the operating condition corresponding to the right-hand section (with reference to FIG. 7) of the solenoid valve, the intake valve V2 controlled by said cam is driven positively by the fluid into the respective pressure chamber C given that said chamber is isolated from the low-pressure environment. At the same time, however, the intake valve V1 controlled by said cam is isolated both from the pressure chamber C and from the low-pressure environment so that it remains blocked in the condition in which it is. This mode of actuation of the intake valves is illustrated in FIG. 7A, and the operating condition of each three-position solenoid valve corresponding to this actuation mode is illustrated in FIG. 7B.

Figure 7A:
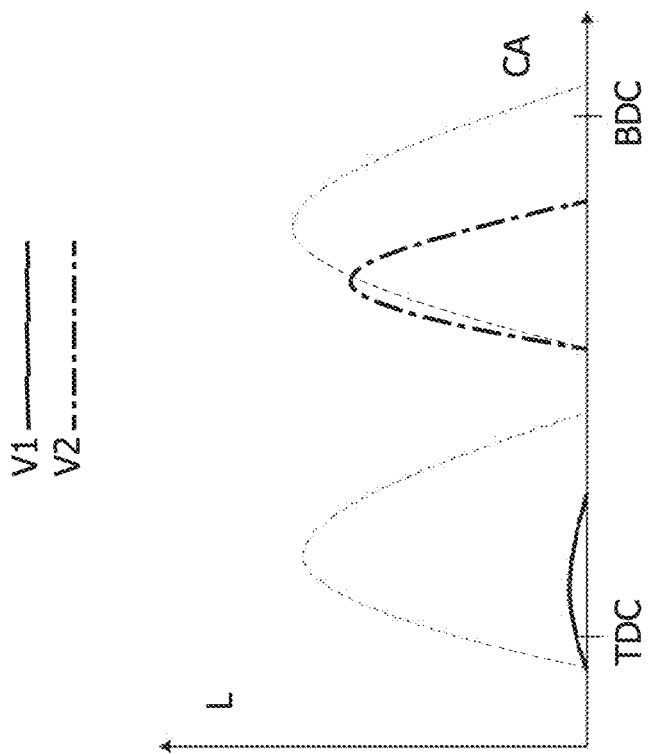
FIG. 7A shows a lift diagram of the intake valves of a cylinder in a mode implemented by the system of FIG. 7, where a first intake valve remains substantially closed, while the second intake valve is in an early-closing mode.

As may be seen, in the case of the embodiment of FIG. 7, it is possible to exclude completely actuation of one of the two intake valves of each cylinder, as it is also possible to adopt an early-closing mode, with partial lift, of the other intake valve of the cylinder (see FIG. 7A).

In a variant, the hydraulic actuators 21 associated with the intake valves V1, V2 of each cylinder have different diameters, so as to give rise to different lifts of the respective intake valves V1, V2 for the same displacement of the respective pumping pistons 16. Additionally or alternatively, the return springs 9 associated with the two intake valves V1, V2 of each cylinder can be provided so as to have loads and/or flexibilities different from each other, so as to give rise to different lifts of the intake valves V1, V2 for the same displacement of the respective pumping pistons (16).

As indicated, the invention may be applied in general to four-cylinder, four-stroke engines, or else also to two-cylinder, two-stroke engines. In theory, the invention could be applied also to an engine with a different number of cylinders (for example, three cylinders) maintaining for one or more cylinders a system of actuation of the intake valves of a conventional type and adopting for the remaining part of the cylinders an actuation system according to the present invention.

Naturally, without prejudice to the principle of the invention, the details of construction and the embodiments may vary widely with respect to what has been described and illustrated herein, without thereby departing from the scope of the present invention.

The invention claimed is:

1. An internal combustion engine, comprising:
   a crankshaft;
   a plurality of cylinders configured to execute respective operating cycles in a predetermined firing order, each cylinder including:
      a piston operatively connected to the crankshaft so as to reciprocate within the cylinder,
      a first intake valve controlling a flow of intake air from a first intake duct, the first intake valve including a first hydraulic actuator and a first return spring, and
      a second intake valve controlling a flow of intake air from a second intake duct, the second intake valve including a second hydraulic actuator and a second return spring;
   a camshaft driven via the crankshaft, the camshaft including a plurality of cams respectively associated with each cylinder;
   a plurality of hydraulic circuits respectively associated with each cam, each hydraulic circuit including:
      a tappet configured to engage the associated cam of the associated cylinder,
      a pressure chamber,
      a pumping piston driven by the associated cam via the tappet, the pumping piston configured to act on the pressure chamber so as to transfer pressurized fluid towards (i) the first hydraulic actuator of the first intake valve of the associated cylinder, and (ii) the second hydraulic actuator of the second intake valve of a preceding cylinder, the preceding cylinder being a cylinder of the plurality of cylinders which immediately precedes the associated cylinder in the predetermined firing order, such that the first and second intake valves of the associated cylinder are respectively controlled via two different cams of the plurality of cams,
      a pressurized-fluid accumulator, and
      an electrically actuated control valve configured to selectively communicate said pressure chamber with the pressurized-fluid accumulator via a low-pressure exhaust channel such that, when said electrically actuated control valve is open, the pressurized fluid is discharged from the pressure chamber into said low-pressure exhaust channel so as to deactivate the first intake valve of the associated cylinder and/or the second intake valve of the preceding cylinder; and
   an electronic controller configured to control each electrically actuated control valve as a function of engine load and engine speed,
   wherein each electrically actuated control valve is further configured to be switched to at least one of:
      a full-lift mode in which both intake valves of the hydraulic circuit operate in accordance with a lift profile of the associated cam,
      an early-closing mode in which both intake valves of the hydraulic circuit operate in accordance with a lift profile that is reduced with respect to the lift profile of the associated cam, and
      a partial deactivation mode in which only one intake valve of the hydraulic circuit is deactivated, and
   wherein, during an intake stage of each cylinder, an opening and closing timing of the second intake valve occurs subsequent to an opening and closing timing of the first intake valve.

2. The internal-combustion engine according to claim 1, wherein each electrically actuated control valve is a two-way, two-position solenoid valve.

3. The internal-combustion engine according to claim 1, wherein each electrically actuated control valve is a three-way, three-position solenoid valve.

4. The internal combustion engine according to claim 1, wherein, in each cylinder, a diameter of the first hydraulic actuator is different from a diameter of the second hydraulic actuator such that the first intake valve and the second intake valve exhibit different lifts.

5. The internal combustion engine according to claim 1, wherein, in each cylinder, the first and second return springs include different spring loads and/or spring constants such that the first intake valve and the second intake valve exhibit different lifts.

* * * * *